US007843875B2

(12) United States Patent
Somasundaram et al.

(10) Patent No.: US 7,843,875 B2
(45) Date of Patent: Nov. 30, 2010

(54) METHOD AND APPARATUS FOR OPTIMIZING E-TFC RESTRICTION FOR HSUPA CHANNELS

(75) Inventors: Shankar Somasundaram, Deer Park, NY (US); Ana Lucia Pinheiro, West Chester, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 305 days.

(21) Appl. No.: 11/934,389

(22) Filed: Nov. 2, 2007

(65) Prior Publication Data

US 2008/0144541 A1    Jun. 19, 2008

Related U.S. Application Data

(60) Provisional application No. 60/864,051, filed on Nov. 2, 2006.

(51) Int. Cl.
H04W 4/00 (2009.01)
H04B 7/212 (2006.01)
H04J 3/16 (2006.01)
H04L 12/403 (2006.01)

(52) U.S. Cl. .................. 370/329; 370/348; 370/437; 455/450

(58) Field of Classification Search .......... 370/310, 370/329, 348, 431, 437, 462, 464, 465; 455/450, 455/509, 522, 418, 420, 434, 419, 423, 424, 455/425

See application file for complete search history.

(56) References Cited

U.S. PATENT DOCUMENTS

| 6,813,284 | B2* | 11/2004 | Vayanos et al. ............ 370/537 |
| 7,050,415 | B2* | 5/2006 | Herrmann et al. .......... 370/338 |
| 7,058,032 | B2* | 6/2006 | Iacono et al. .............. 370/329 |
| 7,130,352 | B2* | 10/2006 | Shimizu .................... 375/260 |
| 7,373,161 | B2* | 5/2008 | Anderson .................. 455/522 |
| 7,411,918 | B2* | 8/2008 | Zhang ...................... 370/252 |
| 7,418,010 | B2* | 8/2008 | Cai et al. ................... 370/498 |
| 7,596,122 | B2* | 9/2009 | Han et al. .................. 370/332 |
| 7,599,320 | B2* | 10/2009 | Ratasuk et al. ............ 370/318 |
| 7,630,733 | B2* | 12/2009 | Usuda et al. ............... 455/522 |
| 7,643,448 | B2* | 1/2010 | Pedersen et al. ........... 370/329 |

(Continued)

FOREIGN PATENT DOCUMENTS

EP        1 349 332        10/2003
WO     2005/067659        7/2005

OTHER PUBLICATIONS

TSG-RAN Meeting Notes: UE Maximum Power Reduction when HS-DPCCH is transmitted, Mar. 10-12, 2004, by Nokia.*

(Continued)

*Primary Examiner*—Warner Wong
(74) *Attorney, Agent, or Firm*—Volpe and Koenig, P.C.

(57) ABSTRACT

Method of and apparatus for searching for enhanced dedicated channel transport format combinations (E-TFCs) in a table is disclosed. A transmission time interval (TTI) and an E-TFC data are received. An appropriate E-TFC table is selected based on the received TTI and E-TFC data. The E-TFC table is split into a plurality of sub-tables. All the E-TFCs in each of the sub-tables have the same maximum power reduction value and are continuous in the table. Each sub-table is searched.

13 Claims, 3 Drawing Sheets

U.S. PATENT DOCUMENTS

| | | | |
|---|---|---|---|
| 2003/0092382 A1 | 5/2003 | Vayanos et al. | |
| 2003/0185193 A1* | 10/2003 | Choi et al. | 370/348 |
| 2005/0141560 A1* | 6/2005 | Muthiah | 370/474 |
| 2005/0169215 A1* | 8/2005 | Cheng et al. | 370/335 |
| 2006/0003733 A1* | 1/2006 | Chun et al. | 455/403 |
| 2006/0062193 A1 | 3/2006 | Choi et al. | |
| 2006/0133313 A1* | 6/2006 | You et al. | 370/329 |
| 2006/0140115 A1* | 6/2006 | Timus et al. | 370/230 |
| 2006/0146833 A1* | 7/2006 | Roberts et al. | 370/395.42 |
| 2006/0217088 A1* | 9/2006 | Nagaoka et al. | 455/127.1 |
| 2007/0155335 A1* | 7/2007 | Love et al. | 455/69 |
| 2007/0161394 A1* | 7/2007 | Kuroda et al. | 455/522 |
| 2008/0159184 A1 | 7/2008 | Niwano | |
| 2008/0305824 A1* | 12/2008 | Haim et al. | 455/522 |

OTHER PUBLICATIONS $3^{rd}$ Generation Partnership Project; Technical Specification Group Radio Access Network; Medium Access Control (MAC) protocol specification (Release 7); 3GPP TS 25.321 V7.2.0 (Sep. 2006).

$3^{rd}$ Generation Partnership Project; Technical Specification Group Radio Access Network; Medium Access Control (MAC) protocol specification (Release 7); 3GPP TS 25.321 V7.6.0 (Sep. 2007).

$3^{rd}$ Generation Partnership Project; Technical Specification Group Radio Access Network; Requirements for support of radio resource management (FDD) (Release 7); 3GPP TS 25.133 V7.5.0 (Oct. 2006).

$3^{rd}$ Generation Partnership Project; Technical Specification Group Radio Access Network; Requirements for support of radio resource management (FDD) (Release 7); 3GPP TS 25.133 V8.0.0 (Sep. 2007).

$3^{rd}$ Generation Partnership Project; Technical Specification Group Radio Access Network; Radio Resource Control (RRC); Protocol Specification (Release 7); 3GPP TS 25.331 V7.2.0 (Sep. 2006).

$3^{rd}$ Generation Partnership Project; Technical Specification Group Radio Access Network; Radio Resource Control (RRC); Protocol Specification (Release 7); 3GPP TS 25.331 V8.0.0 (Sep. 2007).

European Telecommunications Standards Institute, "Universal Mobile Telecommunications System (UMTS); User Equipment (UE) Conformance Specification; Radio Transmission and Reception (FDD); Part 1: Conformance Specification (3GP TS 34.121-1 Version 7.2.0 Release 7)", ETSI TS 134 121-1, V7.2.0, (Oct. 2006).

* cited by examiner

METHOD AND APPARATUS FOR OPTIMIZING E-TFC RESTRICTION FOR HSUPA CHANNELS

CROSS REFERENCE TO RELATED APPLICATION

This application claims the benefit of U.S. provisional application No. 60/864,051, filed on Nov. 2, 2006, which is incorporated by reference as if fully set forth.

FIELD OF INVENTION

The present invention generally relates to a wireless communication system.

BACKGROUND

In universal mobile telecommunications system (UMTS) release 6, a new channel was introduced in the uplink (UL): the enhanced dedicated channel (E-DCH). The E-DCH is an UL-only transport channel mapped to the enhanced packet data physical channel (E-PDPCH). Associated with the E-DCH is the enhanced dedicated physical control channel (E-DPCCH), which is a UL physical channel used to transmit control information. The E-DCH provides higher capacity, higher throughput and reduced delay when compared with the traditional dedicated channels (DCHs). The E-DCH is only applicable to UMTS terrestrial radio access (UTRA) frequency division duplex (UTRA FDD).

The enhanced medium access control (MAC-e) is a new entity that handles the E-DCH transport channel. As in traditional DCHs, the E-DCH is configured with specific E-DCH transport format combinations (E-TFCs). However, as opposed to receiving a set of allowed transport formats from a radio resource control (RRC), the MAC-e is configured to use a set of transport formats based on pre-defined tables.

There are four of the above referenced pre-defined tables in the 3GPP standard. Two tables are used for a 2 ms transmission time interval (TTI), and two tables are used for a 10 ms TTI. A radio resource control (RRC) configures the TTI length, and also, determines which of the two tables the MAC-e should use when selecting a transport format. Table 1 shows a 10 ms TTI E-DCH transport block (TB) size table.

TABLE 1

| TB Index | TB Size (bits) |
| --- | --- |
| 0 | 18 |
| 1 | 120 |
| 2 | 124 |
| 3 | 130 |
| 4 | 135 |
| 5 | 141 |
| 6 | 147 |
| 7 | 153 |
| 8 | 159 |
| 9 | 166 |
| 10 | 172 |
| 11 | 180 |
| 12 | 187 |
| 13 | 195 |
| 14 | 203 |
| 15 | 211 |
| 16 | 220 |
| 17 | 229 |
| 18 | 239 |
| 19 | 249 |
| 20 | 259 |
| 21 | 270 |

TABLE 1-continued

| TB Index | TB Size (bits) |
| --- | --- |
| 22 | 281 |
| 23 | 293 |
| 24 | 305 |
| 25 | 317 |
| 26 | 331 |
| 27 | 344 |
| 28 | 359 |
| 29 | 374 |
| 30 | 389 |
| 31 | 405 |
| 32 | 422 |
| 33 | 440 |
| 34 | 458 |
| 35 | 477 |
| 36 | 497 |
| 37 | 517 |
| 38 | 539 |
| 39 | 561 |
| 40 | 584 |
| 41 | 608 |
| 42 | 634 |
| 43 | 660 |
| 44 | 687 |
| 45 | 716 |
| 46 | 745 |
| 47 | 776 |
| 48 | 809 |
| 49 | 842 |
| 50 | 877 |
| 51 | 913 |
| 52 | 951 |
| 53 | 991 |
| 54 | 1032 |
| 55 | 1074 |
| 56 | 1119 |
| 57 | 1165 |
| 58 | 1214 |
| 59 | 1264 |
| 60 | 1316 |
| 61 | 1371 |
| 62 | 1428 |
| 63 | 1487 |
| 64 | 1549 |
| 65 | 1613 |
| 66 | 1680 |
| 67 | 1749 |
| 68 | 1822 |
| 69 | 1897 |
| 70 | 1976 |
| 71 | 2058 |
| 72 | 2143 |
| 73 | 2232 |
| 74 | 2325 |
| 75 | 2421 |
| 76 | 2521 |
| 77 | 2626 |
| 78 | 2735 |
| 79 | 2848 |
| 80 | 2966 |
| 81 | 3089 |
| 82 | 3217 |
| 83 | 3350 |
| 84 | 3489 |
| 85 | 3634 |
| 86 | 3784 |
| 87 | 3941 |
| 88 | 4105 |
| 89 | 4275 |
| 90 | 4452 |
| 91 | 4636 |
| 92 | 4828 |
| 93 | 5029 |
| 94 | 5237 |
| 95 | 5454 |
| 96 | 5680 |
| 97 | 5915 |
| 98 | 6161 |

TABLE 1-continued

| TB Index | TB Size (bits) |
|---|---|
| 99 | 6416 |
| 100 | 6682 |
| 101 | 6959 |
| 102 | 7247 |
| 103 | 7547 |
| 104 | 7860 |
| 105 | 8186 |
| 106 | 8525 |
| 107 | 8878 |
| 108 | 9246 |
| 109 | 9629 |
| 110 | 10028 |
| 111 | 10444 |
| 112 | 10877 |
| 113 | 11328 |
| 114 | 11797 |
| 115 | 12286 |
| 116 | 12795 |
| 117 | 13325 |
| 118 | 13877 |
| 119 | 14453 |
| 120 | 15051 |
| 121 | 15675 |
| 122 | 16325 |
| 123 | 17001 |
| 124 | 17706 |
| 125 | 18440 |
| 126 | 19204 |
| 127 | 20000 |

The main difference between the E-DCH transport format set and the traditional transport format set, (other than the sizes being pre-configured), is that these tables are very large, whereby each table contains more than 120 TB sizes.

The rules for E-TFC selection are described in the UMTS standards, (e.g., TS 25.331). According to these rules, the E-TFC restriction procedure shall always be applied before the E-TFC selection process. The E-TFC restriction procedure is used because a wireless transmit/receive unit (WTRU) is not allowed to exceed a maximum allowed UL transmission power when transmitting in the UL channels. During the restriction procedure which is performed at every TTI, a WTRU calculates the amount of power required to transmit a given E-TFC. The WTRU then calculates the estimated power leftover from TFC selection when the dedicated physical data channel (DPDCH) is present, and it calculates the leftover power from a high-speed dedication physical control channel (HS-DPCCH) transmission, and a high-speed dedicated physical common control channel (DPCCCH) transmission. If the required power to transmit a given E-TFC is greater than power available to the WTRU, it implies that the E-TFC that requires too much power may not be supported at a given TTI. These E-TFCs are considered to be in a blocked state. The particular E-TFCs that are in a blocked state may vary at every TTI, depending on the level of power consumption by the other UL channels.

The UTRAN should ensure that the ordering of the enhanced transport format combination indicator (E-TFCI) table is in increasing transmission power, by correctly setting of reference E-TFCI power offsets (which are then used to calculate $\beta_{ed,j}$, $\beta_{ed,C,j}$ and $\beta_{c,C}$). This guarantees that the elements of an E-TFC table are ordered in terms of power requirement. Therefore, in order to determine which E-TFC is blocked, the WTRU starts searching from the bottom of the table (largest TB size) and proceeds up the table, until it finds an E-TFC that is not blocked (i.e., unblocked). Once the WTRU finds an unblocked E-TFC it can terminate the search because it can assume that, if an E-TFC of a particular TB size is not blocked, then all E-TFCs with smaller TB sizes are not blocked. Similarly, if an E-TFC of a particular TB size is blocked, then the WTRU can assume that all E-TFCs with larger TB sizes are also blocked.

However, a problem arises with the introduction of the Maximum Power Reduction (MPR) element. A WTRU may reduce the maximum allowed transmit power by the E-TFC MPR values specified in the 3GPP, which are shown in Table 2. With the introduction of MPR, the selection of a supported E-TFC based on the power limitation becomes a more complex and time-consuming procedure. Since the E-TFC MPR values are dependent on the number of codes and the minimum spreading factor allowed to be used, and the MPR values are not directly proportional to the required power of each E-TFC, there will be holes in the E-TFC table. When there are holes, if a given E-TFC is not blocked, that does not necessarily mean that all E-TFCs with smaller TB sizes are also not blocked. So, even though the ETFCs are listed in order of increasing transmission power, because the maximum allowed power ($PMax_j$) varies for each ETFC, and the variation is not directly proportional to the required power of each ETFC, then the assumption that if a given E-TFC of a particular TB size is not blocked then all E-TFCs with smaller TB sizes are also not blocked, does not necessarily hold true. Similarly, if a given E-TFC is blocked, that does not necessarily mean that all E-TFCs with larger TB sizes are also blocked. Table 2 shows an example of an E-TFC-MPR used for E-TFC selection. This creates holes in the table, which means that every ETFC in the table needs to be inspected to verify if they are in a blocked state.

It would therefore be desirable to handle such holes and avoid having to search the entire table by performing faster/smarter searches that do not require searching the entire table.

TABLE 2

Inputs for E-TFC selection

| Case | $\beta_c$ | $\beta_{hs}$ | $\beta_d$ | $\beta_{ec}$ | $\beta_{ed}$ | E-DPDCH SFmin | Ncodes | E-TFC-MPR (dB) |
|---|---|---|---|---|---|---|---|---|
| 1 | >0 | 0 | 0 | >0 | >0 | ≧4 | 1 | 0.25 |
| 2 | >0 | ≧0 | 0 | >0 | >0 | 2 | 4 | 0.50 |
| 3 | >0 | 0 | >0 | >0 | >0 | ≧4 | 1 | 0.75 |
| 4 | >0 | >0 | >0 | >0 | >0 | ≧4 | 1 | 1.50 |
| 5 | >0 | ≧0 | >0 | >0 | >0 | 4 | 2 | 0.75 |
| 6 | >0 | ≧0 | >0 | >0 | >0 | 2 | 2 | 0.50 |

Note:
For inputs {$\beta_c$, $\beta_{hs}$, $\beta_d$, $\beta_{ec}$, $\beta_{ed}$, SFmin, Ncodes} not specified above the E-TFC-MPR (dB) = 0

SUMMARY

A method and apparatus for optimizing a search for E-TFCs in a high speed downlink packet access (HSPDA) system by splitting an E-TFC table into sub-tables is provided. If a particular E-TFC in a sub-table is not blocked, then all E-TFCs in the same sub-table with smaller TB sizes are assumed to be unblocked. If an E-TFC in the sub-table is blocked, then all E-TFCs in the same sub-table with larger TB sizes may also assumed to be blocked.

Once an E-TFC table is selected, a window within the E-TFC table is selected in which to search. A determination is then made as to whether a first element in the search window is blocked. If the first element is blocked, then all of the elements in the search window are assumed to be blocked, and the search is terminated. Otherwise, a determination is made as to whether a last element in the search window is blocked. If the last element is not blocked, then all of the elements less than or equal to the last element in the search window are assumed to be unblocked, and all elements greater than the last element in the search window are assumed to be blocked. If the last element is blocked, the size of the search window is reduced until the last element is determined to not be blocked.

BRIEF DESCRIPTION OF THE DRAWINGS

A more detailed understanding may be had from the following description, given by way of example and to be understood in conjunction with the accompanying drawings wherein.

DETAILED DESCRIPTION

Figure 1:
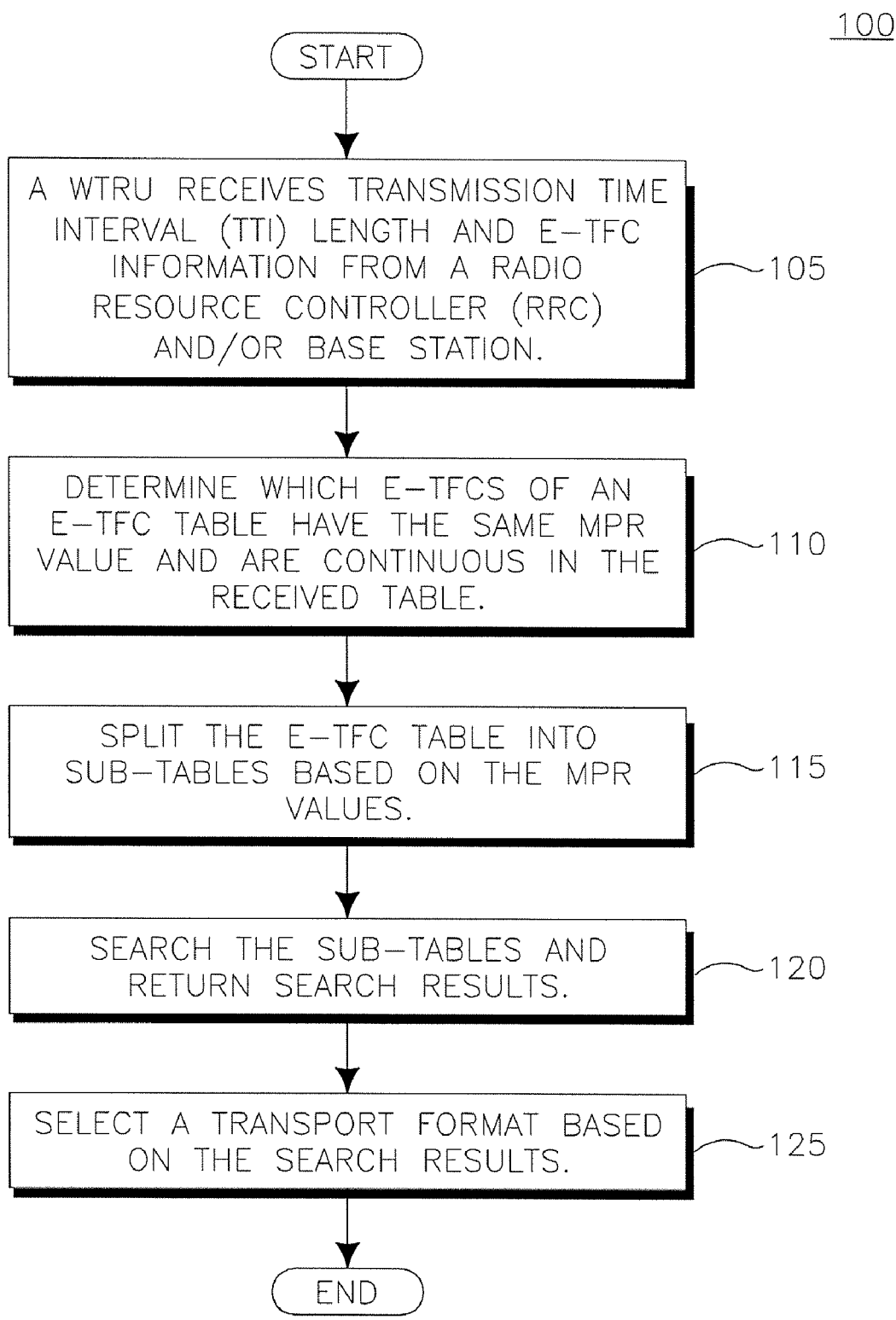
FIG. 1 is a flow chart of a procedure that splits an E-TFC table into sub-tables for E-TFC restriction.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

The E-TFC MPR Table 2 shows that the MPR values are a function of the following: the channel gain value $\beta_{hs}$, (which indicates if the HSDPA channel is being used in the TTI), the channel gain value $\beta_d$ (which indicates if a DCH channel is being used in the TTI), SFmin (minimum spreading factor required by the E-TFC), TFC), and Ncodes (number of codes required by the E-TFC). Wherein $\beta_{hs}$ and $\beta_d$ are fixed in a given TTI (i.e., same value for all E-TFCs). Ncodes and SFmin are functions of the Transport Block (TB) size and vary per E-TFC.

In every TTI, the WTRU determines the absence or presence of HSDPA and a DCH, and depending on the scenario, to look up the corresponding value of the MPR in the Table 2. The MPR value is then subtracted from the maximum power to determine the allowed power output by the WTRU.

Consider, for example, the following four different cases depending on the presence or absence of HSDPA and DCH. The four cases are as follows:

1) $\beta hs=0$ and $\beta d=0$ (No HSDPA, No DCH);
2) $\beta hs>0$ and $\beta d=0$ (HSDPA present, No DCH);
3) $\beta hs=0$ and $\beta d>0$ (No HSDPA, DCH present); and
4) $\beta hs>0$ and $\beta d>0$ (HSDPA present, DCH present).

As seen from the MPR table 2, for each of the above scenarios, the values of MPR will be different based on the values of SFmin and Ncodes.

For example, for TFCs with SFmin>=4 and Ncode=1, the values of MPR are:

1) MPR=0.25 for $\beta hs=0$ and $\beta d=0$;
2) MPR=0.75 for $\beta hs=0$ and $\beta d>0$; and
3) MPR=1.5 for $\beta hs>0$ and $\beta d>0$.

Note that E-TFCs are listed in increasing order of TB size. Moreover, according to UMTS standards, the number of codes and SF for each E-TFC is selected based on the following order: {N256, N128, N64, N32, N16, N8, N4, 2×N4, 2×N2, 2×N2+2×N4}. This implies that E-TFCs are listed in increasing order of SF and number codes.

Based on the above observations, if the MPR value is different for any two consecutive E-TFCs in the table, then there is a "hole" in the E-TFC table.

The following tables list the MPR values for each of the four cases listed above. The tables below also contain the number of holes in the E-TFC table for each case. The number of holes for each case depicted varies as a result of changes in the MPR values as the Ncodes increase and the SF decreases.

Note that SFmin is equal to SF in all cases expect the case where there are four codes, in which case there are two SF2 and two SF4.

Case 1: $\beta_{hs}=0$ and $\beta_{d}=0$

TABLE 3

| SF | Ncodes | MPR | Number of holes |
|---|---|---|---|
| >=4 | 1 | 0.25 | 2 |
| 4 | 2 | 0 | |
| 2 | 2 | 0 | |
| 2, 4 | 4 | 0.5 | |

Case 2: $\beta_{hs}>0$ and $\beta_{d}=0$

TABLE 4

| SF | Ncodes | MPR | Number of holes |
|---|---|---|---|
| >=4 | 1 | 0 | 1 |
| 4 | 2 | 0 | |
| 2 | 2 | 0 | |
| 2, 4 | 4 | 0.5 | |

Case 3: βhs=0 and βd>0

TABLE 5

| SF | Ncodes | MPR | Number of holes |
|---|---|---|---|
| >=4 | 1 | 0.75 | 2 |
| 4 | 2 | 0.75 | |
| 2 | 2 | 0.5 | |
| 2, 4 | 4 | 0 | |

Case 4: βhs>0 and βd>0

TABLE 6

| SF | Ncodes | MPR | Number of holes |
|---|---|---|---|
| >=4 | 1 | 1.5 | 3 |
| 4 | 2 | 0.75 | |
| 2 | 2 | 0.5 | |
| 2, 4 | 4 | 0 | |

In a first embodiment the E-TFC table is split into logical sub-tables where each sub-table contains all the E-TFCs which have the same MPR value and are continuous in the table.

Therefore, within each sub-table, the following rule applies: If an E-TFC in the sub-table is not blocked, then all E-TFCs in the same sub-table with smaller TB sizes are also not blocked. Similarly, if an E-TFC in the sub-table is blocked, then all E-TFCs in the same sub-table with larger TB sizes are also blocked.

FIG. 1 is a flow chart of a search procedure 100 according to a first embodiment. In step 105, a WTRU receives a TTI length and E-TFC information from a base station and/or RRC regarding which of the pre-defined tables the MAC-e should use when selecting a transport format. In step 110, the WTRU determines which E-TFCs of an E-TFC table have the same MPR values and are continuous in the E-TFC table based on the information. Next, in step 115, the WTRU the splits the E-TFC table into M sub-tables, where each sub-table contains the E-TFCs of the same MPR value and are continuous. In step 120, the WTRU searches the M sub-tables according to a suitable algorithm. If an E-TFC in one of the M sub-tables is not blocked, then all of the E-TFCs in the sub-table with smaller TB sizes are unblocked. Finally, in step 125, the WTRU selects a transport format based on the search results.

By allowing the WTRU to apply the above rule within each sub-table, the search is performed faster because it can be performed independently within each sub-table. An efficient search algorithm to further optimize the search within a sub-table is disclosed below.

Note that the number of sub-tables in a given table may be given by (Number of holes +1). The boundary between two sub-tables is known as the sub-table boundary. Once a table splitting, as shown in Table 6, is performed, the sub-table boundary is automatically defined. The procedure below is an algorithm to optimize the search that is performed within every sub-table to look for the blocked E-TFCs and hence using the algorithm can make the search process faster. The sub-table boundaries depict the amount of searching that is required. Therefore, depending on the number of sub-tables, the search algorithm is iteratively applied to each sub-table and the boundaries are used to differentiate between the sub-tables. In order to determine the sub-table boundaries, h1, h2 and h3 are defined as follows:

h1: largest E-TFC in the E-TFC table that requires one code;

h2: largest E-TFC in the E-TFC table that requires two codes with SF4; and h3: largest E-TFC in the E-TFC table that requires two codes with SF2.

The maximum number of sub-tables in any of the cases listed is four. Depending on the case, some boundaries disappear. The boundaries for each case are as follows:

Case 1: there are three sub-tables with boundaries at h1 and h3.

Case 2: there are two sub-tables with boundaries at h3.

Case 3: there are three sub-tables with boundaries at h2 and h3.

Case 4: there are four sub-tables with boundaries at h1, h2, and h3.

In another embodiment, a procedure for a search within an E-TFC table is disclosed. In the case of E-TFC sub-tables, the algorithm should be applied independently in each sub-table as if they were individual E-TFC tables. Consider the following procedure:

1. Let T=size of the table;
2. Select a window size: W;
3. let last-element=T;
4. let first-element=T−W;
5. While first-element is blocked and first-element≠1; first-element=MAX (first-element−W, 1); last-element=last element−W;
6. If first-element is blocked, then all elements are blocked;
7. Else (first-element is not blocked);
8. While last element is blocked, last-element=last element−1;
9. All elements smaller than or equal to last-element are not blocked;
10. All elements greater than last-element are blocked.

The procedure described above should be repeated independently for each sub-table. If all elements of all sub-tables are blocked, then the WTRU should use the minimum allowed E-TFC set.

Figure 2:
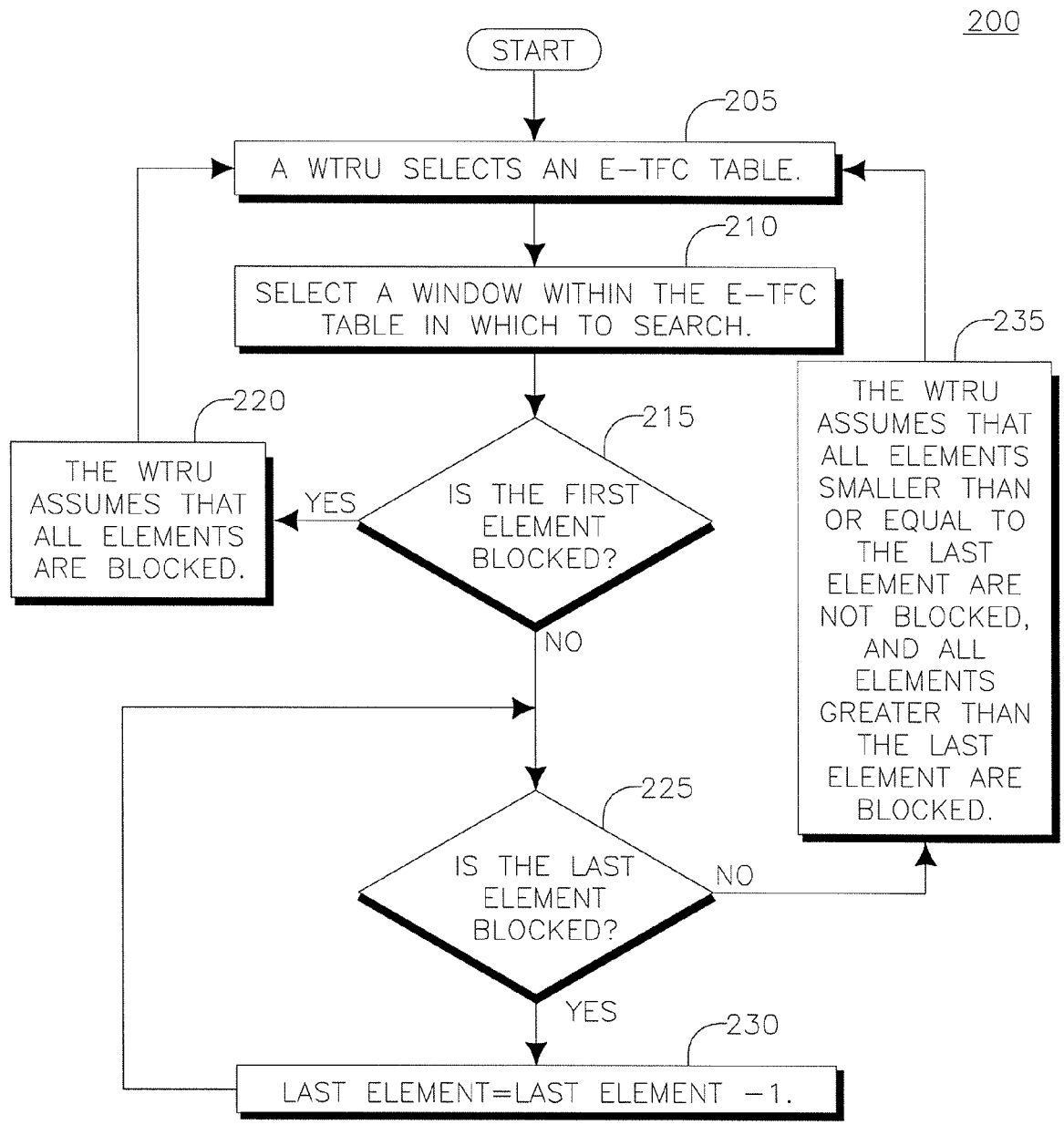
FIG. 2 is a flowchart of an optimized search procedure.

FIG. 2 is a flowchart of an optimized search procedure 200. In step 205, the WTRU selects an E-TFC table. In step 210, the WTRU selects a window within the E-TFC table in which to search. Each table is arranged in ascending order; therefore, the first element is the smallest element. The WTRU determines whether the element in the search window is blocked, step 215. Since the first element is the E-TFC which requires the least power in the table, if the first element is determined in step 215 to be blocked, then the WTRU assumes that all the elements in the search window are blocked (step 220), and the WTRU can then either terminate the search, or search another E-TFC table. If the first element is determined in step 215 to not be blocked, (i.e., unblocked), the WTRU then checks the last element within the window (step 225). If the last element of the search window is determined in step 225 to be blocked, the WTRU will decrement the size of the search window by setting the current last element to the last element−1 (step 230) and repeat step 225. The WTRU will continue repeating steps 225 and 230 which will decrease the size of the window until it is determined that the last element is not blocked. Once the WTRU finds a current last element that is unblocked, the WTRU assumes that all of the elements in the window that are smaller than or equal to the current last element are not blocked, and all of the elements that are greater than the current last element are blocked (step 235), and the WTRU can then either terminate the search, or search another E-TFC sub-table. The above procedure has been described in use with an E-TFC without MPR, however it may be used even in the case where there is MPR, in which case the E-TFC sub-tables described above may be used.

The window search procedure described above outperforms the sequential search in cases where the top-most E-TFC in the window (i.e., the E-TFC with smallest TB size in the window) is blocked. The only case where the proposed algorithm requires more instructions than the sequential search is the case where the top-most E-TFC in the window is not blocked, in which case there will be one extra comparison required by the window search algorithm (when compared with a sequential search). Thus, as long as the window size N is chosen such that the probability that the last N E-TFCs in the sub-table are blocked is high, the window search algorithm will outperform the sequential search algorithm on average.

The window size can be fixed or a dynamically adjusted window size. For example, if the known probability of finding the blocked E-TFCs in the N last elements of the table is high, the window size should be fixed to N. Moreover, the value of N is a function of several factors, such as WTRU location (pathloss), presence of DCH and HSDPA, etc. As a result the value of N can vary on a TTI basis according to the above listed factors or other factors.

In yet another embodiment, for sub-tables higher up in an E-TFC table, the size of the window may be reduced by a given number, because the chance of finding blocked E-TFCs in that sub-table is small.

By implementing the above described window technique in combination with the sub-tables technique, the number of searches required to find the blocked E-TFCs and isolate the holes can be performed faster than a step by step comparison of all the 128 E-TFCs present in the table.

Figure 3:
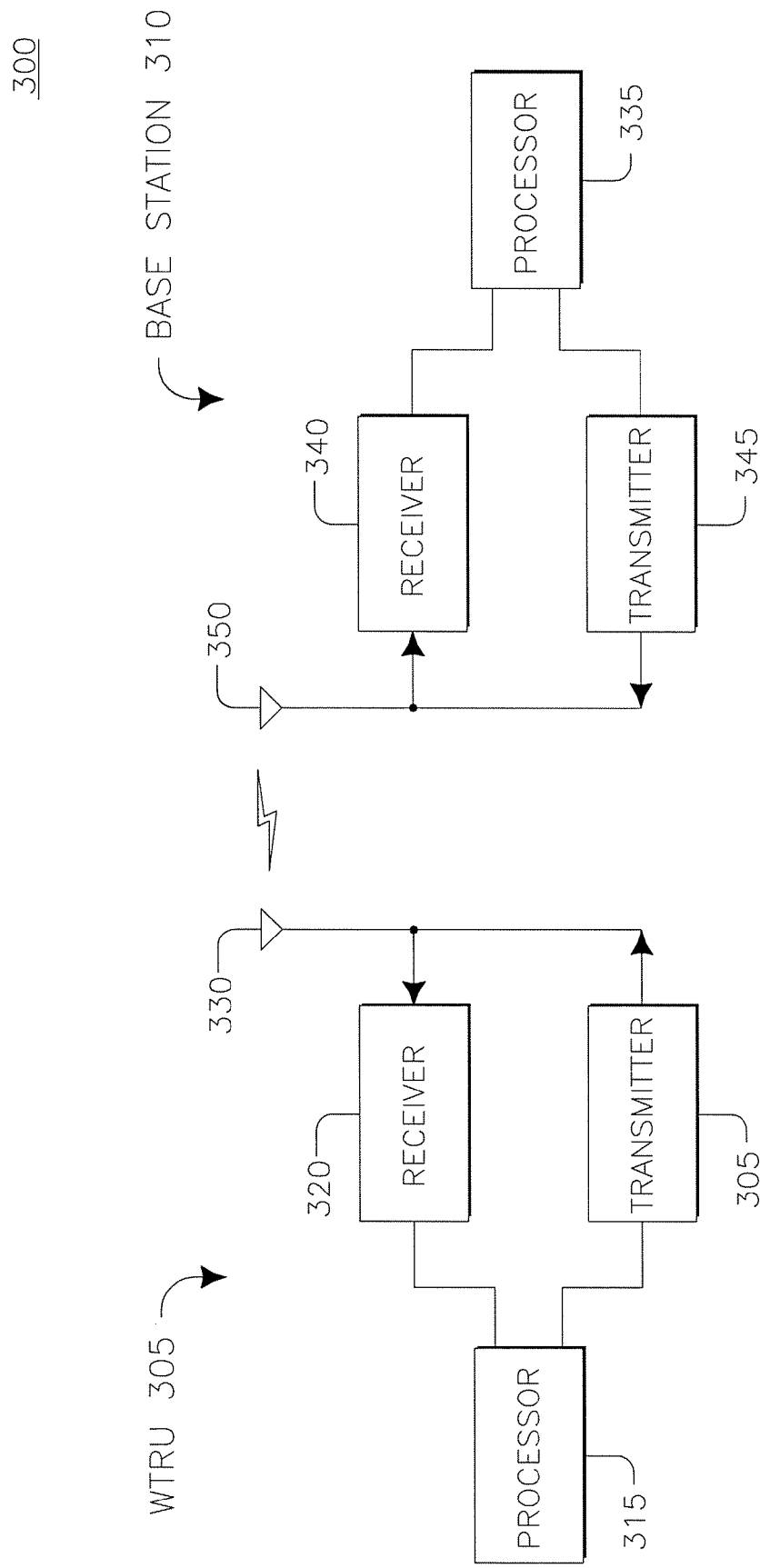
FIG. 3 is a wireless communication system including a WTRU and a base station configured to perform the procedures of FIGS. 1 and 2.

FIG. 3 shows a wireless communication system 300 including a WTRU 305 and a base station 310. The E-TFC and MPR table is predefined in the UMTS standards and so the WTRU 305 has the table pre-configured and pre-coded in a memory 355. The base station 310, using RRC procedures, signals certain reference values to the WTRU 305. The values are used to calculate quantized amplitude ratio for each ETFC. The WTRU 305 may include a processor 315, a receiver 320, a transmitter 325 and an antenna 330. The base station 310 may include a processor 335, a receiver 340, a transmitter 345 and an antenna 350. The WTRU 305 and the base station 310 are each configured to perform a method of optimizing E-TFC restriction when MPR values are used.

The processor 335 in the base station 310 generates information that indicates a TTI length and E-TFC information including an E-TFC table. The transmitter 345 transmits this information via the antenna 350. Reference values are signaled to the WTRU 305 which are used in the power restriction procedure. The E-TFC table is predefined and pre-stored in a memory 355 of the WTRU 305. In the WTRU 305, the information is received by the receiver 320 via the antenna 330, and is forwarded to the processor 315. The processor 315 is configured to determine which E-TFCs have the same MPR values and are continuous in the received E-TFC table. The processor 315 is further configured to split the E-TFC table into sub-tables based on the MPR values. The processor 315 is also configured to search the sub-tables and select a transport format for the WTRU 305 to use when communicating with the base station 310.

Although the features and elements are described in particular combinations, each feature or element can be used alone without the other features and elements or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method, implemented in a wireless transmit/receive unit (WTRU), of searching for enhanced dedicated channel transport format combinations (E-TFCs) in a table, the method comprising:

receiving a transmission time interval (TTI) and an E-TFC data;

selecting an appropriate E-TFC table based on the received TTI and E-TFC data;

splitting the E-TFC table into a plurality of sub-tables, wherein each of the plurality of sub-tables contains all of the E-TFCs that have a same maximum power reduction value and are continuous in the table; and searching each of the plurality of sub-tables.

2. The method of claim 1 wherein the searching further comprises:

determining whether an E-TFC in one of the plurality of sub-tables is not blocked, which indicates that all E-TFCs in the same one of the plurality of sub-tables with smaller transport block (TB) sizes are also not blocked; and determining whether an E-TFC in the sub-table is blocked, which indicates that E-TFCs in the same one of the plurality of sub-tables with larger TB sizes are blocked.

3. The method of claim 1 further comprising:

selecting a transport format based on the searching of each of the plurality of sub-tables.

4. The method of claim 1 further comprising:

determining a presence of a high speed downlink packet access channel (HSDPA) and a dedicated channel (DCH) in each of a plurality of transport time intervals (TTI).

5. The method of claim 4 further comprising:

determining an allowed power for the WTRU.

6. The method of claim 5 comprising determining a minimum power reduction (MPR) value corresponding to the presence of the HSPDA and the DCH and subtracting the value from a maximum power to calculate the allowed power.

7. The method of claim 1 wherein the searching is performed independently in each of the plurality of sub-tables.

8. A wireless transmit/receive unit (WTRU), comprising:

a memory configured to store an E-TFC table;

a processor configured to split the E-TFC table into a plurality of sub-tables, wherein each sub-table contains all of the E-TFCs that have the same maximum power reduction value and are continuous in the table; and the processor further configured to search each of the plurality of sub-tables.

9. The WTRU of claim 8 wherein:

the processor is configured to determine whether an E-TFC in a sub-table is not blocked, which indicates that all E-TFCs in the same sub-table with smaller transport block (TB) sizes are also not blocked; and the processor further configured to determine whether an E-TFC in the sub-table is blocked, which indicates that E-TFCs in the same sub-table with larger TB sizes are blocked.

10. The WTRU of claim 8 wherein the processor is further configured to select a transport format based on the searching of each of the plurality of sub-tables.

11. The WTRU of claim 8 further comprising:

a receiver configured to determine the presence of a high speed downlink packet access (HSDPA) channel and a dedicated channel (DCH) in each of a plurality of transport time intervals (TTI).

12. The WTRU of claim 8 wherein the processor is configured to determine an allowed power for the WTRU.

13. The WTRU of claim 12 wherein:

the processor is configured to determine a minimum power reduction (MPR) value corresponding to the presence of the HSPDA and the DCH; and the processor is further configured to subtract said value from a maximum power to calculate the allowed power.

* * * * *